Jan. 9, 1923.
W. GRIKSCHEIT.
VALVE FITTING.
FILED JAN. 2, 1920.
1,442,026.
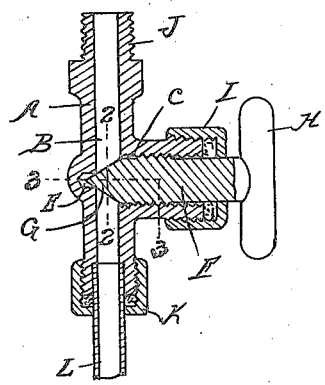
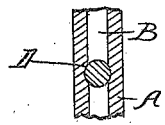
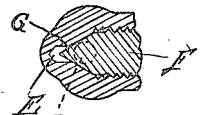
Inventor
William Grikscheit
By Whittemore Hulbert & Whittemore
Attorneys Patented Jan. 9, 1923.

1,442,026

UNITED STATES PATENT OFFICE.

WILLIAM GRIKSCHEIT, OF DETROIT, MICHIGAN, ASSIGNOR OF ONE-HALF TO THOMAS B. MOTHERSILL, OF WINDSOR, ONTARIO, CANADA.

VALVE FITTING.

Application filed January 2, 1920. Serial No. 348,878.

*To all whom it may concern:*

Be it known that I, WILLIAM GRIKSCHEIT, a citizen of the United States of America, residing at Detroit, in the county of Wayne and State of Michigan, have invented certain new and useful Improvements in Valve Fittings, of which the following is a specification, reference being had therein to the accompanying drawings.

The invention relates to valve fittings designed for use as pet cocks, priming cups, feed line valves, etc., and consists in the construction as hereinafter set forth.

In the drawings:

Figure 1 is a longitudinal section of a construction designed for a feed line;

Figure 2 is a section on the line 2—2 of Figure 1.

Figure 3 is a section on the line 3—3 of Figure 1.

My improved fitting comprises a substantially T-shaped member A having a longitudinal bore B therethrough, and an intersecting bore C through the stem of the T. This intersecting bore is formed with a tapering inner end, so as to produce a conical seat D intersecting the bore B and having a slight clearance at its apex, as indicated at E. F is a valve stem having a threaded engagement with the bore C and provided with a conical end portion G corresponding to the conical seat D. The arrangement is such that when the valve is pressed to its seat, it will completely close the bore B and by adjusting the valve away from its seat the bore B may be opened with any desired degree of restriction.

As shown in Figure 1, the stem F is provided with a handle H and a packing gland I is arranged at the outer end of the stem portion of the casing A. This construction also shows one end of the casing A as having a threaded nipple J and the opposite end provided with a coupling K for attachment to a pipe line L.

What I claim as my invention is:

A valve fitting, comprising a T-shaped fitting provided with a passageway through the head, and a passage way through the stem portion, the latter passageway terminating in a conical seat intersecting said first mentioned passageway, said fitting counterbored around and beyond the apex of said conical seat, internal and external threads on said stem portion, a valve stem threadedly engaging said internal threads provided with a conical end portion for engaging said conical seat, the apex of said end engaging in said counterbore and a cap surrounding said valve stem engaging the external threads on said stem portion.

In testimony whereof I affix my signature.

WILLIAM GRIKSCHEIT.